Feb. 4, 1958 C. W. TYDEMAN 2,821,964
MACHINE TOOL FEED CONTROL VALVES
Filed Nov. 14, 1955 6 Sheets-Sheet 1

INVENTOR.
CLARENCE W. TYDEMAN
BY
ATTORNEYS

Feb. 4, 1958     C. W. TYDEMAN     2,821,964
MACHINE TOOL FEED CONTROL VALVES
Filed Nov. 14, 1955     6 Sheets-Sheet 2

INVENTOR.
CLARENCE W. TYDEMAN
BY
ATTORNEYS

INVENTOR.
CLARENCE W. TYDEMAN
BY
ATTORNEYS

INVENTOR.
CLARENCE W. TYDEMAN
BY
ATTORNEYS

Feb. 4, 1958  C. W. TYDEMAN  2,821,964
MACHINE TOOL FEED CONTROL VALVES
Filed Nov. 14, 1955  6 Sheets—Sheet 6

INVENTOR.
CLARENCE W. TYDEMAN
BY
*Anderson & Spangler*
ATTORNEYS

United States Patent Office 2,821,964
Patented Feb. 4, 1958

2,821,964

MACHINE TOOL FEED CONTROL VALVES

Clarence Walter Tydeman, Redwood City, Calif.

Application November 14, 1955, Serial No. 546,329

16 Claims. (Cl. 121—45)

This invention relates to improvements in machine tool feed control valves and has reference more particularly to control valves of the type shown, described and claimed in applicant's co-pending applications, Serial Number 324,805, filed December 8, 1952, now abandoned, and application Serial Number 379,667, filed September 11, 1953, now Patent Number 2,765,808. This application is a continuation-in-part of both application Serial Number 324,805 and application Serial Number 379,667 identified above.

Valves of the type to which this invention relates are employed primarily with machine tools such as boring machines, turret lathes and shapers, which employ hydraulic fluid under high pressure, frequently as high as 1000 lbs. per square inch, and must be so designed that they can be readily operated magnetically at all pressures and that they will not leak, and if they leak at all, so that the amount of leakage shall be negligible. The construction of a valve of this type has been described in considerable detail in the applications above identified.

One object of this invention is to produce a control valve of the type above indicated, which shall have, in addition to the usual forward working speed, a "quick traverse" speed for hastening the forward movement of the tool over spaces that do not require machining, and in addition, a fast return stroke.

Another object is to provide means for automatically altering the forward work stroke speed to adapt the rate of feed more accurately to the requirements of the several successive surfaces machined.

Another important object is to provide means that will prevent the hydraulic fluid from entering the control valve passages during the return stroke and the quick traverse portion of the work stroke.

A further object of the present invention is to provide a control valve which can be stopped instantaneously and placed in standby condition at any point in either the feed or return strokes irrespective of the speed of movement of the tool.

The above and any other objects that may become apparent as the description proceeds and/or to which attention may be called are attained by means of a construction and an arrangement of parts that will now be described in detail, for which purpose reference will be had to the accompanying drawings in which the invention has been illustrated, and in which.

Figures 1, 2:
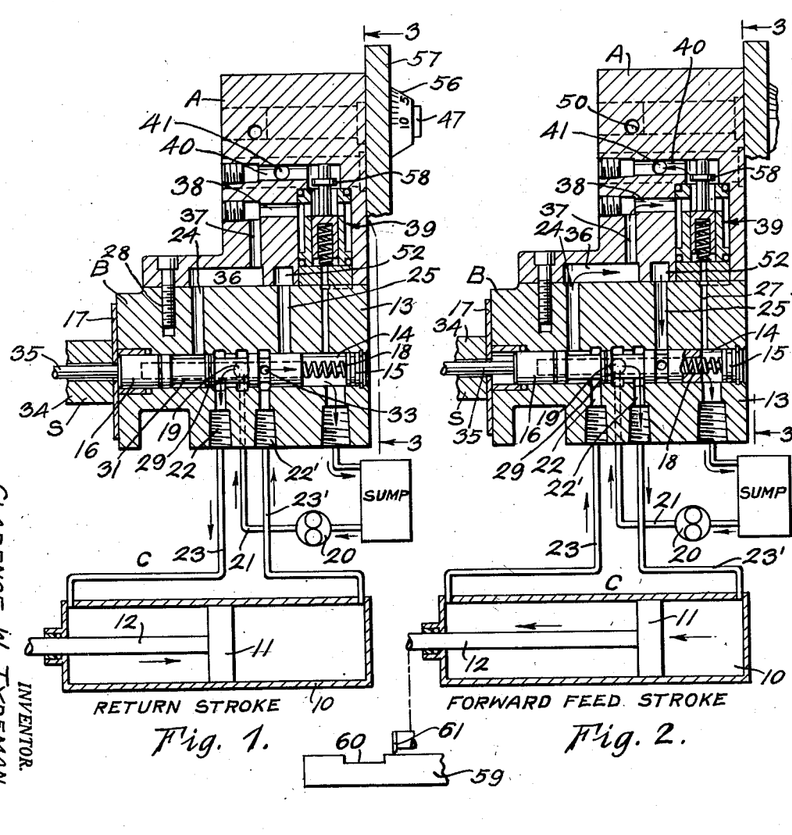
Figure 1 is a view partly diagrammatic and partly a section taken on line 1—1 Figure 3, and shows the parts in position to effect a return stroke of the hydraulic ram device.
Figure 2 is a view, similar to that shown in Figure 1 but with the parts arranged to effect a forward stroke of the hydraulic piston.
Figure 3:
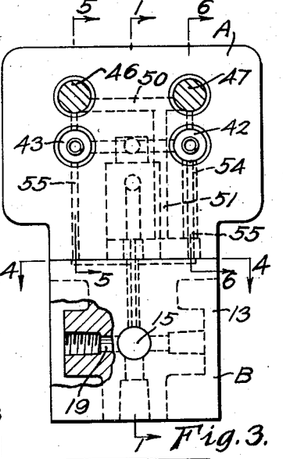
Figure 3 is a side elevational view of the valve block looking in the direction of arrows 3—3 Figures 1 and 2.
Figure 4:
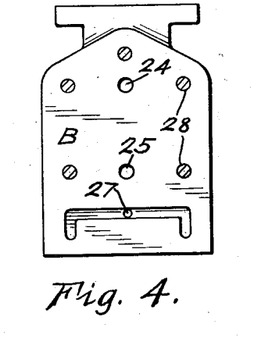
Figure 4 is a top plan view of the direction control valve block looking in the direction of arrows 4—4 in Figure 3.

Referring now to the drawing, attention will first be called to the fact that the apparatus is composed of three separate and separable parts that have been designated by capital letters A, B and C in Figure 1 for convenience of description.

Figures 8, 11, 12, 13, 14:
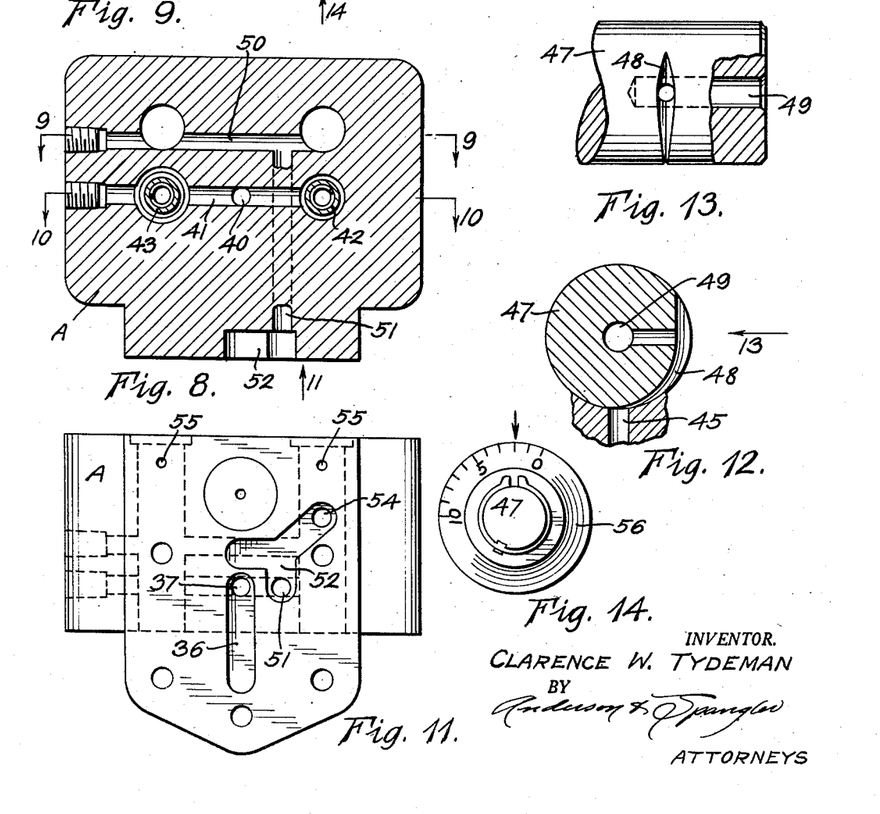
Figure 8 shows a section taken on line 8—8 Figure 5.
Figure 11 is an elevational view looking in the direction of arrow 11 Figure 8.
Figure 12 is a section taken on line 12—12 Figure 9.
Figure 13 is a fragmentary elevational view, partly in section, looking in the direction of arrow 13 Figure 12.
Figure 14 is an elevational view of one of the valve adjusting dials, looking through plane 14—14 Figure 5.
Figure 9:
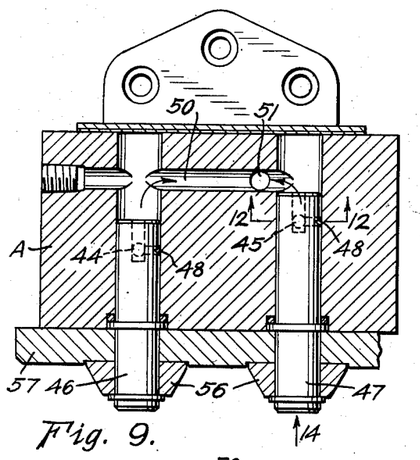
Figure 9 is a section taken on line 9—9 Figure 8.
Figure 10:
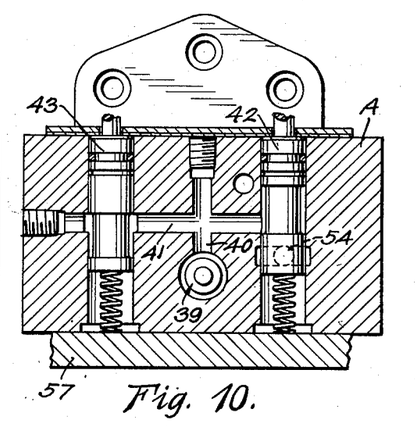
Figure 10 is a section taken on line 10—10 Figure 8.

Part C has been shown in a diagrammatic manner and represents an ordinary hydraulic force exerting device comprising a cylinder 10, a piston 11 and a piston rod 12, and represents a hydraulic metal shaper or a boring device that is extensively employed and which will not be described in greater detail herein because the invention resides in the construction and cooperation of the control valve comprised in parts A and B. Part B contains the directional control valve and consists of the body 13 which has a valve opening 14 one end of which is closed by a plug 15. A cylindrical slide valve 16 is urged away from plug 15 and towards plate 17 by a spring 18 that is positioned in the axial opening in the valve as shown. Body 13 has an inlet port 19 that is positioned substantially midway between the ends of opening 14, which port is connected with the discharge port of a high pressure liquid pump 20 by means of a conduit 21. Two ports 22 and 22' are connected respectively to the left and right-hand ends of cylinder 10 by pipes or conduits 23 and 23' and communicate with the valve opening equidistantly from port 19 on opposite sides thereof. A high pressure outlet port 24 extends upwardly at a point beyond port 22 and a discharge port 25 extends upwardly in the same relative position as port 24 with respect to port 19. Plug 15 is held in place by means of a snap ring 26. A leakage passage 27 extends vertically into body 13 and is in communication with passage 14, as shown. In addition, body 13 has various threaded openings like 28 for cap screws. Slide valve 16 has two positions: the one shown in Figure 2 corresponds to the forward feed stroke; and, the position shown in Figure 1 corresponds to the rapid return stroke. It will be observed that the slide valve has an annular cylindrical surface 29 that in the specific construction illustrated, is positioned midway between the ends of the valve and has a peripheral groove 30 that is in communication with the axial opening through one or more radial openings. On opposite sides of the said annular surface are sections 31 and 31' of smaller diameter. Sections 31 and 31' have been shown as of the same length and when the valve is in the position shown in Figures 1 and 15 the reduced section 31 is in communication with port 24 only, while reduced diameter section 31' communicates the high pressure intake port 19 with port 22 that communicates with the left-hand end of the cylinder through conduit or pipe 23. The valve has a narrower section 32 that is in communication with the axial opening through radial hole 33 and it is also in communication with port 22'. It is to be understood that those portions not designated as of reduced or smaller diameter have a sliding fit with the opening. Attention is directed in particular to the fact that when the slide valve is in the position shown in Figures 1 and 15 the right-hand end of the valve covers the entrance to port 25 so that none of the fluid discharged from the axial opening during the rapid return stroke of the piston can enter port opening 25. When piston 11 has reached the limit of its return stroke it actuates a switch (not shown) and energizes solenoid 34 whose plunger 35 moves valve 16 to the right and into the position shown in Figure 2. Whereupon, the intake port is put into communication with outlet port 22' and fluid under high pressure is then directed into the right-hand end of the cylinder to move the piston forwardly in the feed stroke. The left-hand end of the cylinder is now in communication with port opening 24 which directs fluid under pressure into recess 36 in part A. The path through which the fluid flows will now be described. From recess 36 the fluid passes by way of passages 37 and 38 into the top of the compensator or pressure regulator 39, thence into passages 40 and 41 to the normally closed rapid traverse valve 42 and to the normally open feed control valve 43, as shown in Figure 10; thence upwardly through passages 44 and 45 to speed control valves 46 and 47 respectively (see Figures 5 and 6); thence through the graduated escape passages 48 into the axial openings 49, thence into passage 50 and down through the discharge passage 51 to the recess 52 from which it passes into passage 25 in body 13 from which it returns to the sump (Figures 1 and 2). From Figure 6 it will be seen that a passage 54 connects recess 52 with the opening in which valve 42 moves and which is normally closed by valve 42, when it is moved to the quick traverse position shown in Figure 7. Part A is provided with two passages 55 that conduct leakage into passage 27 from which it flows into passage 25 and returns to the sump. Valves 16, 42 and 43 are held in normal position by springs as shown and are actuated against the spring action by push type solenoids, that have been designated by letter S, whose structure and operation is so well understood that no detailed description is considered necessary. Each solenoid is independently actuated by means of micro-switches and relays that are closed and opened by the machine to change the direction of movement of the tool (here represented by the piston rod 12). Referring now more particularly to Figures 5, 6, 9, 12, 13 and 14, it will be observed that valves 46 and 47 are rotatable and have escape passages 48 that are inwardly tapered in cross section and of gradually increasing depth as shown in Figure 12. When the valves are in the position shown in Figure 12 the escape opening is very close to minimum. Attached to the outer ends of these valves are knobs 56 that have graduations on their edges as shown in Figure 14. The escape groove is so designed that if the smallest opening represented by the first graduation, is taken as a unit, it will increase in a predetermined manner in direct proportion to the scale readings. The scale, therefore, provides a very accurate means for setting the valves.

It is evident from the drawing and the above description that the two control valves 46 and 47 are arranged in parallel relation and that the quantity of liquid that normally escapes from in front of the moving piston is the sum of the quantities that pass through both valves, and since both are adjustable, a very fine adjustment of the tool movement can be effected. When valve 43 that controls the flow of fluid to speed control valve 46 is moved towards the right (Figure 5), by the action of the solenoid until it closes port 41, no fluid can pass to valve 46 and the rate of tool movement is then controlled entirely by valve 47 and the tool can thus be made to move very slowly. At this point attention is again called to Figure 12 and to the fact that the fluid from 45 enters the escape opening at its smallest point and there can be no gradual accumulation of matter that would cause final stoppage of the opening as there might be if the fluid flowed in the opposite direction. Plate 57 is secured to blocks A and B by cap screws and is forced against suitable gaskets and serves as an abutment for the several valve biasing springs. The compensator 39 is of usual construction and will, therefore, not be described in detail except to say that the parts are so arranged and related that the valve portion 58 will move to closed position if the pressure in passage 40 exceeds a predetermined amount, and it, therefore, serves to maintain a constant liquid pressure at the escape openings 48 of the speed control valves. The pressure of the liquid at the left of the piston plus the pressure of the tool against the work equals the pressure exerted on the right end of the piston and, therefore, the liquid pressure per square inch in the left end of the cylinder is variable which would preclude an accurate speed control in the absence of the compensator or pressure regulator.

In the above description the tool is controlled as to speed in its forward or working stroke only and the return stroke is rapid because the discharge from the cylinder is unimpeded (see Figure 1). There are occasions, however, where it is desirable to control the return stroke as to speed also. Sometimes the tool by dwelling or moving slowly on the return stroke gives a higher finish to the work and then on some occasions it is found desirable to effect the main machining operation as the piston rod moves into the cylinder. In order to effect a controlled movement in both directions of travel it is necessary to make some changes from what has been described above and these have been shown in Figures 17, 18 and 19, to which reference will now be had. The parts common to Figures 16, 17, 18 and 19 are designated by the same numerals in all these figures.

Figure 16:
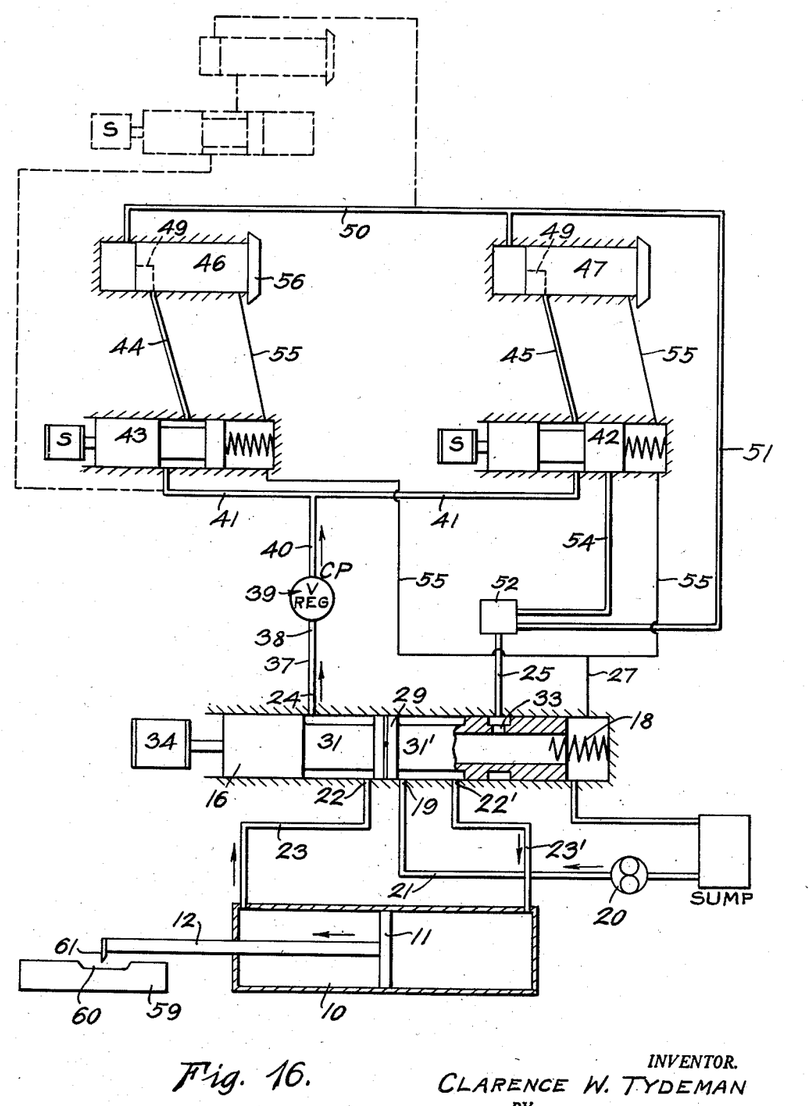
Figure 16 is a diagrammatic view in the nature of a flow sheet showing the relationship of the several elements and the path of the hydraulic fluid during the work stroke.
Figures 17, 18, 19:
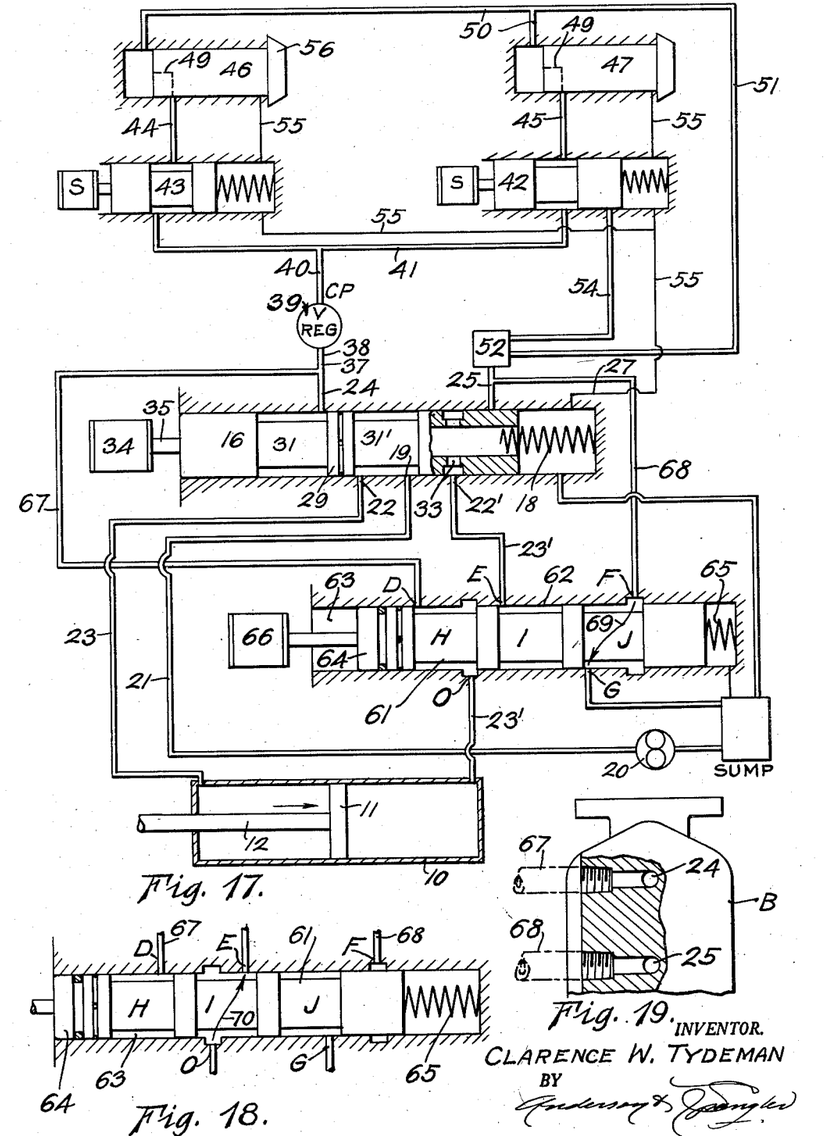
Figure 17 is a diagram showing a modification.
Figure 18 is a sectional view showing a different position of the reversing valve shown in Figure 17.
Figure 19 is a fragmentary view, partly in section, showing a modification of the valve block shown in Figure 4; and, Figures 20 and 21 show a slightly modified construction.

From Figures 1 and 16 it will be seen that on the return stroke of the piston the liquid has an unobstructed flow from the exhaust end of the cylinder to the sump and that there are no means for restricting the rate of liquid flow or the piston and tool movement. To effect the same speed control on the return stroke it becomes necessary to direct the liquid exhausted from the right-hand end of the cylinder into passage 24 while retaining the left-hand end of the cylinder in communication with the high pressure port 19 as shown in Figure 1. To effect this additional control it is necessary to introduce a magnetically operable control valve in the discharge path as shown in Figure 17. For simplicity of explanation it will be considered as if valve 61 is part of a separate structure comprising a body 62 that is provided with a longitudinal bore 63 in which is mounted for limited sliding movement a piston type valve 64. Communicating with bore 63 are five passages whose ports have been designated by letters O, D, E, F and G. The slide valve has a tight sliding fit in bore 63 and is provided with sections H, I and J of smaller diameter. A spring 65 extends into an axial opening in the valve and is always under compression and, therefore, urges the valve towards the left to the position shown in Figure 18. A solenoid 66 of the pusher type, similar to solenoid 34, when energized moves valve 64 to the position shown in Figure 17 in which position reduced section H provides communication from that part of passage 23' adjacent the cylinder, to passage 24 through passage 67. Since the direction control valve 16 is in the position shown in Figures 1 and 17, passage 24 is in communication with reduced section 31 of valve 16 and the liquid must, therefore, pass through the pressure regulator and one or more of the speed control valves and thence to recess 52, from whence it flows by way of passage 68 to bore 63 and into reduced section J thence to the sump by way of passage 69. It is now evident that with the parts in the position shown in Figure 17, the speed at which the tool returns can be controlled in the same manner as the forward stroke. In Figures 17 and 18 the arrows 69 and 70 indicate respectively the direction of fluid flow during the return and the forward strokes of the piston. When valve 64 is in the position shown in Figure 18 the operation is identical with that shown in Figure 16 and which will presently be described. Figure 19 shows where conduits 67 and 68 connect with passages 24 and 25 respectively.

*Operation*

The operation of the mechanism will now be briefly described. Let us assume that the tool acts as a shaper or controls the reciprocating bed of a shaper carrying a piece 59 to be surfaced and that the work piece has a depression 60 that does not require machining (see Figure 2). The parts are arranged as shown in Figure 2 and valves 46 and 47 are adjusted to the desired speed. The tool 61 travels towards the left and as it enters the depressed area it closes a normally open switch and energizes the solenoid that controls the position of valve 42, moving it to the position shown in Figure 7, thus opening a bypass about the speed control valves and permits the liquid to pass directly into the return passage 54 and the tool will then move quickly across the depression. Just before the tool reaches the far side of the depression the switch that was closed as it entered the depression will now open and the speed returns to that corresponding to the setting of valves 46 and 47. This speeding up of the tool has been designated as "rapid traverse." When the tool reaches the far edge of the work it opens the switch that controls the position of valve 16 and spring 18 returns the valve to the position shown in Figure 1. Whereupon, the liquid under pressure is directed into the left end of the cylinder and the liquid from the right side of the piston flows through port 22' into the axial opening in valve 16 and back into the sump. Since the liquid has a free passage the tool will make the return stroke at high speed. As soon as the return stroke is completed the switch that controls the solenoid which moves valve 16 closes and the cycle repeats from there on. The above is merely an example and it is to be understood that the action of a boring machine or of a plurality of machines operating consecutively can be automatically controlled.

If during operation of the tool an occasion arises in which it becomes necessary to stop the tool and place it in standby condition, such can be instantly accomplished by merely energizing both solenoids 34 and 66 at the same time in the valve construction illustrated in Figure 17. When this is done, the hydraulic fluid will flow from pump 20 through conduit 21 into reduced section 31' of slide valve 16. Only valve 61 is shown energized in Figure 17. The energized position of valve 16 is shown in Figure 16. Conduit 22 is sealed from reduced section 31' by annular cylindrical surface 29 as shown in Figure 16; whereas, conduit 22' is open to receive fluid from conduit 21 through reduced section 31'. Any leakage past cylindrical surface 29 is conducted back to the sump through annular groove 30, the axial opening in the valve body 16 and the conduit to the sump. Also, any leakage past the cylindrical section between reduced section 31' and reduced section 32 (Figure 5) will be conducted back to the sump through radial passage 33 and the axial opening in the valve body 16. In Figure 17 it will be seen that the fluid from conduit 22' is trapped in reduced section I of valve body 64 which has no outlet opening therein when valve 61 is energized. Thus, the flow of fluid through the system stops abruptly leaving the tool in standby condition regardless of the position of the piston and irrespective of whether the tool is moving through its feed stroke or return stroke. Also note that to place the tool and control valve in standby condition it is only necessary to energize one of the solenoids 34 or 66 as the other will already be open depending on whether the tool is moving through its feed or return stroke.

Attention will now be directed to a very important feature of the construction which appears very simple but which, nevertheless, is an essential for rapid and reliable operation. When the direction control valve is in the position shown in Figure 1 fluid at high pressure will enter the cylinder at the left of the piston and since there is an open passage from the right end of the cylinder to the sump the piston will move at high speed towards the right and if the discharge end of valve 16 covers the entrance to passage 25 fluid will not flow upwardly and through the leak passages 27 and 55 into the openings occupied by the springs and valves 42 and 43 and into the compensator and thus interfere with the free movement of these parts.

Figures 5, 6, 7, 15:
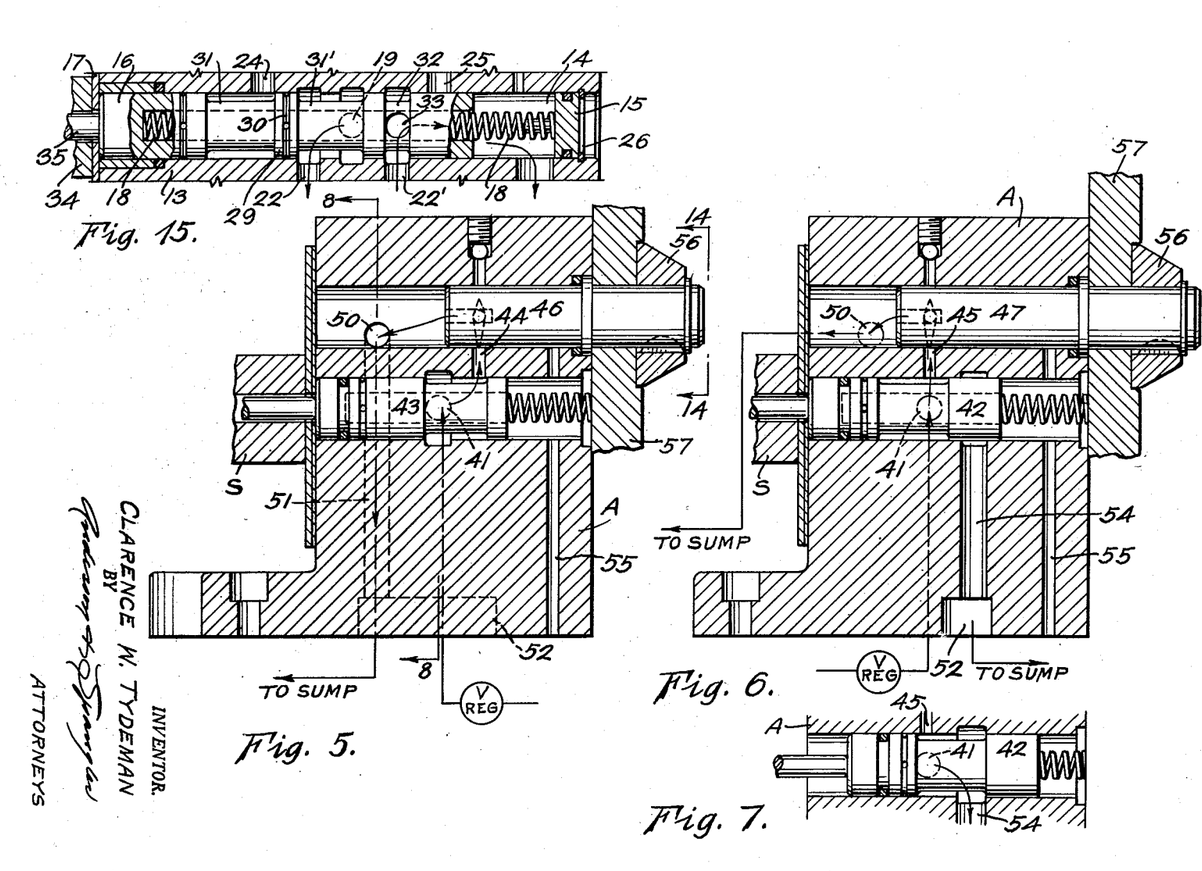
Figure 5 is a section taken on line 5—5 Figure 3.
Figure 6 is a section taken on line 6—6 Figure 3.
Figure 7 is a fragmentary section, similar to Figure 6 and shows the rapid traverse position of the valve.
Figure 15 is a sectional view similar to Figure 1 showing a small portion of body 13 to an enlarged scale to facilitate the description.
Figure 20:
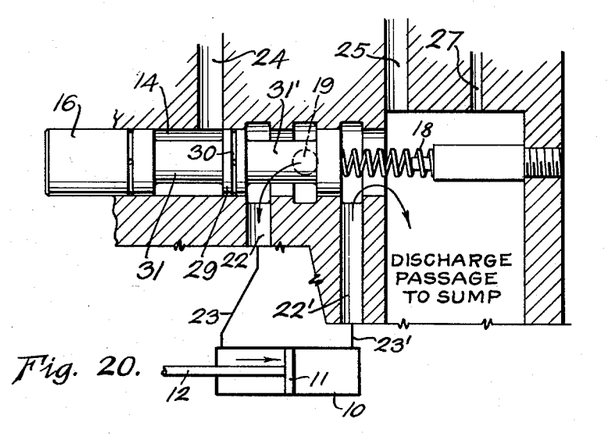
Figure 21:
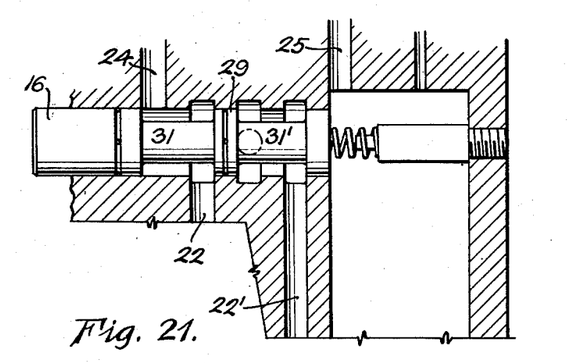

If the passage communicating bore 14 with the sump is made large enough to prevent the development of any appreciable back pressure the danger of fluid flowing upwardly through passage 25 will be averted and the construction can, therefore, be modified as shown in Figures 20 and 21 from which it will be seen that the direction control valve 16' is made shorter than the one shown in Figure 15, and terminates at the left edge of the discharge passage 22'. The passage communicating with the sump is of large cross section so as to preclude the formation of any appreciable back pressure and there is, therefore, no need to cover the port to passage 25.

Attention is called to the fact that valve 46 may be duplicated, that is, that many other valves of identical construction may be connected in parallel with it and similarly controlled by solenoids and switches and thus a greater number of forward speeds obtained.

The positions of the micro-switches and relays by which the several solenoids are controlled have not been shown because their positions depend on the operation to be performed and must be selected as to time of operation and position by the engineer that sets the machine up for operating in the desired cycle.

What is claimed as new is:

1. A control valve for effecting a predetermined cyclic operation of a hydraulic mechanism comprising a cylinder having a piston therein and a piston rod effecting an operable connection with a mechanism on the outside; said valve comprising a body having an elongated cylindrical bore, a slide valve in the bore, electromagnetic means for reciprocating the slide valve, the body having an intake port positioned midway between the ends of the bore, arranged to receive hydraulic fluid from a high pressure pump, two cylinder outlet ports positioned one on each side of the intake port for effecting communication with opposite ends of the cylinder, the slide valve having an axial opening, a central section having a peripheral groove in communication with the axial opening, and two sections of reduced diameter one on each side of the central section, the length of one of said sections being such that it embraces the intake port and either one of the cylinder ports depending on the position of the valve, the body having a high pressure port passage positioned beyond the corresponding cylinder port and on the opposite side of the central section from the intake port, the length of the corresponding reduced section of the valve being such that it embraces both the high pressure port and the adjacent cylinder port in one position of the valve, the intake port and the high pressure port being always in communication with their corresponding reduced sections, a low pressure discharge port position in the body on the opposite side of the intake port from the high pressure port, the slide valve having a third section of reduced cross section beyond the intake port communicating section, positioned to register alternately with the low pressure discharge port and the corresponding cylinder port depending on the position of the valve, the body having fluid passages communicating the high pressure outlet port with the low pressure discharge port, said passage having arranged in series therewith a pressure regulating valve and an adjustable speed control valve positioned beyond the pressure regulator, the body having also a bypass communicating that portion between the pressure regulating valve and the low pressure discharge port, and a normally closed electrical openable valve controlling the flow through the bypass whereby when said valve is opened the piston in the cylinder will move at a rapid speed.

2. A mechanism in accordance with claim 1 in which there are two independently adjustable speed control valves connected in parallel between the pressure regulator and the low pressure discharge port and in which means comprising a normally open electrically closable valve is connected in series with each of said speed control valves, positioned in the flow conduit from the pressure regulator to the speed control valves so that by closing any one of said valves the speed of the work stroke of the piston will be reduced.

3. A mechanism in accordance with claim 1 in which there are a plurality of independently adjustable speed control valves connected in parallel between the pressure regulator and the discharge port and in which means comprising a normally open electrically closable valve is connected in series with each speed control valve so that by closing any one of said valves the speed of the work stroke will be correspondingly decreased.

4. A mechanism in accordance with claim 1 in which the direction control valve is so proportioned, constructed and related to the ports in the valve body that when it is in rapid return stroke position it closes the entrance to the low pressure discharge passage thereby preventing hydraulic fluid from flowing into the valve chambers in response to the back pressure of the hydraulic fluid discharged through said direction control valve.

5. A mechanism in accordance with claim 1 in which means comprising a magnetically controlled valve is so positioned and operatively related to the conduit passage from the discharge end of the piston during the return stroke that the liquid discharged is directed into the high pressure port passage at a point between the direction control valve and the pressure regulator so that the rate of piston travel can be controlled by the speed control valves during the return stroke of the piston.

6. In a mechanism for reciprocating a tool relative to an article to be machined; of the type having a cylinder, a piston therein and a piston rod extending to the outside of the cylinder for positioning and operatively moving the tool, a source of hydraulic fluid under pressure and means comprising a slide valve for directing hydraulic fluid to selected ends of the cylinder and for returning the fluid to its source at a controlled rate; comprising a metal body having passages for conducting the liquid discharged from the cylinder to a discharge port in communication with the source, at least two independently adjustable speed control valves connected in parallel in said passage for controlling the rate at which fluid can flow from the discharge end of the cylinder during the work stroke of the piston, a constant pressure outlet valve operatively associated with the flow passage, positioned to deliver fluid at a constant pressure to the speed control valves, said body having a bypass communicating those portions of the passage between the outlet side of the constant pressure valve with that portion of the passage near the discharge port, a normally closed electrically openable valve means operatively associated with the bypass to control the flow of fluid therethrough, a normally open electrically closable valve means operably associated with that portion of the passage between the bypass and one of the speed control valves to reduce the speed of piston movement, electro-magnetic means for moving the direction control valve to reverse the direction of piston movement and to simultaneously close the entrance port to the high pressure fluid flow passage.

7. A device in accordance with claim 6 in which the direction control valve when in piston reversing position closes the port entrances to both ends of the fluid flow passage.

8. A device in accordance with claim 6 in which the speed control valves have a rotary valve member provided with an axial opening and on the outside with a peripheral groove in communication with the axial opening, the groove having a gradually increasing cross-sectional area for communication with the intake port and are provided with a knob having angularly spaced indicia graduations to facilitate the setting to any desired valve opening.

9. A device in accordance with claim 6 in which means comprising a magnetically controlled valve is so positioned and operatively related to the conduit passage from the discharge end of the piston during the return stroke that the liquid discharged is directed into the high pressure outlet port passage at a point between the direction control valve and the pressure regulator so that the rate of piston travel can be controlled by the speed control valves during the return stroke of the piston.

10. A device in accordance with claim 6 in which the direction control valve when it is in rapid traverse return stroke position terminates adjacent the inner edge of the cylinder exhaust port and in which the passage to a sump is of a size to prevent the formation of back pressure.

11. A hydraulic device for controlling the movements of machine tools and the like comprising: a hydraulic fluid reservoir; pressure generating means connected to the reservoir to receive fluid therefrom; a valve body having a valve opening therein; an intake passage connecting the pressure generating means into the valve opening; a hydraulic cylinder having a forward and rear end; a first fluid passage interconnecting the forward end of the cylinder with the valve opening on one side of the intake passage; a second fluid passage interconnecting the rear end of the cylinder with the valve opening on the other side of the intake passage; a piston mounted in the cylinder for reciprocatory movement toward the forward end of said cylinder on the feed stroke thereof and toward the rear end on the return stroke, said piston being operatively connected to a machine tool or the like for effecting movement thereof; pressure regulating means; at least one feed control valve connected to the pressure regulating means; at least one speed control valve connected to the feed control valve; a third fluid passage interconnecting the pressure regulating means with the valve opening beyond the first fluid passage; a fourth fluid passage interconnecting the speed control valve with the valve opening beyond the second fluid passage; a by-pass connection interconnecting the feed control valve with the fourth fluid passage; an exhaust passage interconnecting the reservoir with the valve opening beyond the fourth fluid passage, and, a valve member mounted for reciprocating movement in the valve opening between a feed position and a return position, said valve member including means for selectively interconnecting the intake passage with one of the first and second fluid passages to effect reciprocatory movement of the piston, said means operating with the valve in feed position to interconnect the intake passage with the second fluid passage and to interconnect the first fluid passage with the third fluid passage, said means operating with the valve member in return position to interconnect the intake passage with the first fluid passage and to disconnect the third fluid passage from the fluid supply, said valve member also including means interconnecting the second fluid passage with the exhaust passage in the return position of said valve member and interconnecting the fourth fluid passage with the exhaust passage in the feed position thereof, said feed control valve forming means for by-passing the speed control valve when the valve member is in feed position by interconnecting the third fluid passage with the by-pass connection and shutting off the supply of fluid to said feed control valve thereby achieving rapid feed of the piston, and said speed control valve forming means for regulating the speed of feed of the piston when the valve member is in feed position and the feed control valve is positioned to close the by-pass connection and admit fluid to said speed control valve.

12. A device in accordance with claim 11 in which the means for selectively interconnecting the intake passage with one of the first and second fluid passages comprises a first and second section of reduced diameter separated by an annular section in sealed engagement with the valve opening wall, the first section of reduced diameter opening on to both the first and third fluid passages in the return position of the valve member, the annular section separating the intake passage from the first fluid passage in the return position of the valve member and separating the first and third fluid passages in the feed position thereof, and the second section of reduced diameter opening on to both the intake passage and the second fluid passage in the feed position of the valve member and opening on to both the intake passage and the first fluid passage in the return position thereof.

13. A device in accordance with claim 11 in which there are at least two feed control valves and at least two speed control valves, each of the feed control valves being connected in series with at least one speed control valve to form a set of valves, each set of valves being connected in parallel with one another between the pressure regulating means and the fourth fluid passage.

14. A device in accordance with claim 11 in which valve means are provided in the second fluid passage between the cylinder and the valve opening for placing the piston in standby condition, said valve means when closed cooperating with the valve member in feed position to shut off the return of fluid to the reservoir from the rear end of the cylinder.

15. A device in accordance with claim 11 in which means are provided in the second fluid passage for regulating the return stroke of the piston and placing said piston in standby condition, said means comprising: a second valve opening separating the second fluid passage into an intake segment and an exhaust segment lying in longitudinally spaced relation along said opening; a fifth fluid passage interconnecting the third fluid passage between the first valve opening and the pressure regulating means with the second valve opening on the opposite side of the intake segment from the exhaust segment; and, a second valve member mounted for reciprocation within the second valve opening between a first and second position, said second valve member having means operative to selectively interconnect the intake segment with either the exhaust segment or the fifth fluid passage, said means in the first position of said second valve means operating to interconnect the intake segment with the fifth fluid passage and separate the intake segment from the exhaust segment whereby the movement of the piston on the return stroke will be regulated by the feed control valve and speed control valve when the first valve member is in return position, said means operating with the second valve member in first position and the first valve member in feed position to stop the flow of fluid through the second fluid passage and thereby place the piston in standby condition, said means operating with the second valve member in second position to interconnect the intake segment with the exhaust segment and separate the intake segment from the fifth fluid passage whereby the piston will return rapidly when the first valve member is in return position, and said means operating with the second valve member in second position and the first valve member in feed position to interconnect the exhaust segment and the intake segment and separate the fifth fluid passage therefrom so that the feed stroke of the piston may proceed in the normal manner.

16. A device in accordance with claim 12 in which means interconnecting the second fluid passage with the exhaust passage in the return position of the valve member and interconnecting the fourth fluid passage with the exhaust passage in the feed position thereof comprises a passage within the interior of the valve member opening into the valve opening at the end thereof containing the exhaust passage, an annular cavity separated from the second reduced section by a second annular section in sealed engagement with the valve opening wall, and a radial passage interconnecting the annular cavity with the passage in the interior of said valve member, said annular cavity registering with the fourth fluid passage in the feed position of the valve member and registering with the second fluid passage in the return position thereof.

References Cited in the file of this patent

UNITED STATES PATENTS

| | | |
|---|---|---|
| 2,157,707 | Keel | May 9, 1939 |
| 2,365,987 | Zimmerman | Dec. 26, 1944 |
| 2,392,074 | Wasson | Jan. 1, 1946 |
| 2,616,398 | Emrick | Nov. 4, 1952 |
| 2,765,808 | Tydeman | Oct. 9, 1956 |